US010679248B1

(12) United States Patent
Demsey (10) Patent No.: US 10,679,248 B1
(45) Date of Patent: Jun. 9, 2020

(54) SYSTEMS AND METHODS FOR STORING AND SHARING TELEPHONE CALL DATA USING ONLINE ADVERTISING SYSTEMS

(71) Applicant: AOL Advertising Inc., New York, NY (US)

(72) Inventor: Seth Mitchell Demsey, Dulles, VA (US)

(73) Assignee: Verizon Media Inc., Dulles, VA (US)

(*) Notice: Subject to any disclaimer, the term of this patent is extended or adjusted under 35 U.S.C. 154(b) by 646 days.

(21) Appl. No.: 14/867,920

(22) Filed: Sep. 28, 2015

(51) Int. Cl.
G06Q 30/00 (2012.01)
G06Q 30/02 (2012.01)
H04M 3/22 (2006.01)
H04M 3/493 (2006.01)

(52) U.S. Cl.
CPC ...... G06Q 30/0255 (2013.01); H04M 3/2218 (2013.01); H04M 3/4936 (2013.01)

(58) Field of Classification Search
None
See application file for complete search history.

(56) References Cited

U.S. PATENT DOCUMENTS

| | | | | |
|---|---|---|---|---|
| 6,061,433 A | * | 5/2000 | Polcyn | H04M 3/493 379/207.15 |
| 2003/0132830 A1 | * | 7/2003 | Dow | G07C 9/27 340/5.22 |
| 2011/0230229 A1 | * | 9/2011 | Das | G06Q 30/02 455/550.1 |
| 2012/0109384 A1 | * | 5/2012 | Stepanian | G06F 21/10 700/275 |
| 2012/0282903 A1 | * | 11/2012 | Rabra | H04M 3/42272 455/414.1 |

(Continued)

FOREIGN PATENT DOCUMENTS

| | | | |
|---|---|---|---|
| GB | 2420644 A | * | 5/2006 |
| JP | 2010063172 A | * | 3/2010 |
| JP | 2014170415 A | * | 9/2014 |

OTHER PUBLICATIONS

Wikipedia—Interactive voice response. (Retrieved online Dec. 20, 2018). https://en.wikipedia.org/wiki/Interactive_voice_response (Year: 2018).*

(Continued)

Primary Examiner — James A Reagan
(74) Attorney, Agent, or Firm — Bookoff McAndrews, PLLC (57) ABSTRACT

Systems and methods are disclosed for storing and sharing telephone call data using online systems. One method includes receiving, over an electronic network, call data relating to a telephone call from a telephone device of a consumer to a business, the call data including a telephone number of the telephone device of the consumer; accessing a database storing correlated call data and user data; retrieving correlated call data and user data based on the telephone number of the call data; determining a confidence score that defines a confidence that the received call data relates to the retrieved correlated call data and user data; correlating the received call data with retrieved call data and user data when the confidence score is greater than a threshold value; and determining a targeted advertisement based on the correlated call data and user data.

20 Claims, 3 Drawing Sheets

(56) References Cited

U.S. PATENT DOCUMENTS

2013/0055097 A1* 2/2013 Soroca ............... G06Q 30/0247
                                                                                                   715/738

OTHER PUBLICATIONS

NICE. No Need to Press Zero—NICE Makes Automated Phone Service Effortless with New IVR Journey Analytics. (Mar. 26, 2015). Retrieved online Feb. 8, 2020. https://www.nice.com/engage/press-releases/No-Need-to-Press-Zero-NICE-Makes-Automated-Phone-Service-Effortless-with-New-IVR-Journey-Analytics-351/.*

Chen, Jennifer. How to Set Up a Phone Menu for Small Business. (Apr. 30, 2014). Retrieved online Feb. 8, 2020. https://telzio.com/blog/phone-menu (Year: 2014).*

Suhm et al. A Data-Driven Methodology for Evaluating and Optimizing Call Center IVRs. (Jan. 2002). Retrieved online Feb. 8, 2020. https://link.springer.com/article/10.1023/A:1013674413897 (Year: 2002).*

NICE. No Need to Press Zero—NICE Makes Automated Phone Service Effortless with New IVR Journey Analytics. (Mar. 26, 2015). Retrieved online Feb. 8, 2020. https://www.nice.com/engage/press-releases/No-Need-to-Press-Zero-NICE-Makes-Automated-Phone-Service-Effortless-with-New-IVR-Journey-Analytics- (Year: 2015).*

* cited by examiner

FIG. 2

FIG. 3 ously have no knowledge...

SYSTEMS AND METHODS FOR STORING AND SHARING TELEPHONE CALL DATA USING ONLINE ADVERTISING SYSTEMS

TECHNICAL FIELD

The present disclosure relates to storing and sharing telephone call data using online advertising systems, and more particularly, to storing and sharing telephone call data between businesses and users who opt-in to such sharing, for use in performing targeted Internet advertising.

BACKGROUND

Online advertising has become a popular method by which advertisers can reach consumers. Online advertising provides opportunities for advertisers to target their advertisements to a particular audience in a highly targeted and valuable way. In many instances, website publishers and/or online advertising providers may identify a consumer and his or her activity during their visit to a website in order to provide advertisements targeted to a particular interest of a consumer, as inferred from that online browsing history. Traditionally, a consumer is identified across many websites through the use of user-specific identifiers, which may be facilitated by Internet cookies and/or through tracking images or pixels provided with a website.

Thus, online advertisements that are provided along with the content of a website can be targeted to a consumer based on the identified consumer and his or her interactions with web pages provided by one or more publishers. In order to generate revenue, a publisher that provides the advertisement on a web page may charge an advertiser each time a consumer views the advertisement (e.g., causing an "impression") and/or interacts with (e.g., clicks on) the advertisement on the web page, thereby being directed to a website associated with the advertiser.

In order to provide highly relevant advertisements and/or content to consumers, publishers of websites and online advertising providers have traditionally relied on online user data. However, publishers and online advertisers have not been able to utilize a consumer's calling a telephone number of a business for products and/or services in order to provide highly relevant content and/or advertisements. Further, publishers and advertisers may not have a readily verifiable way of receiving telephone related information because the publishers and online advertisers traditionally have no knowledge of a telephone call to the business by a consumer. Additionally, businesses may not have an online presences, may desire to advertise on the online to its customers. A business may desire to use a consumer's identification online in order to provide an online advertisement that is targeted and/or re-target its current and/or previous customers, and/or to reconnect to customers who did not complete a transaction during a telephone call.

The present disclosure is directed to overcoming one or more of the above-referenced challenges, for example, by storing and sharing telephone call data between businesses and users who opt-in to such sharing, for use in performing targeted Internet advertising.

SUMMARY OF THE DISCLOSURE

Embodiments of the present disclosure include systems and methods for storing and sharing telephone call data using online systems.

According to embodiments of the present disclosure, a computer-implemented method for storing and sharing telephone call data using online systems is disclosed. One method includes receiving, over an electronic network, call data relating to a telephone call from a telephone device of a consumer to a business, the call data including a telephone number of the telephone device of the consumer; accessing, by at least one processor, a database storing correlated call data and user data; retrieving, by the at least one processor, correlated call data and user data based on the telephone number of the call data; determining, by the at least one processor, a confidence score defining a confidence that the received call data relates to the retrieved correlated call data and user data; correlating, by the at least one processor, the received call data with retrieved call data and user data when the confidence score is greater than a threshold value; and determining, by the at least one processor, a targeted advertisement to display to the consumer upon the consumer visiting a publisher web page or a web page of the business, based on the correlated call data and user data.

According to embodiments of the present disclosure, a system for storing and sharing telephone call data using online systems is disclosed. One system includes a data storage device that stores instructions system for storing and sharing telephone call data using online systems; and a processor configured to execute the instructions to perform a method including: receiving, over an electronic network, call data relating to a telephone call from telephone device of a consumer to a business, the call data including a telephone number of the telephone device of the consumer; accessing a database storing correlated call data and user data; retrieving correlated call data and user data based on the telephone number of the call data; determining a confidence score defining a confidence that the received call data relates to the retrieved correlated call data and user data; correlating the received call data with retrieved call data and user data when the confidence score is greater than a threshold value; and determining a targeted advertisement to display to the consumer upon the consumer visiting a publisher web page or a web page of the business, based on the correlated call data and user data.

According to embodiments of the present disclosure, a non-transitory computer-readable medium storing instructions that, when executed by a computer, cause the computer to perform a method for storing and sharing telephone call data using online systems is disclosed. The method of the non-transitory computer-readable medium including: receiving, over an electronic network, call data relating to a telephone call from a telephone device of a consumer to a business, the call data including a telephone number of the telephone device of the consumer; accessing, by at least one processor, a database storing correlated call data and user data; retrieving, by the at least one processor, correlated call data and user data based on the telephone number of the call data; determining, by the at least one processor, a confidence score defining a confidence that the received call data relates to the retrieved correlated call data and user data; correlating, by the at least one processor, the received call data with retrieved call data and user data when the confidence score is greater than a threshold value; and determining, by the at least one processor, a targeted advertisement to display to the consumer upon the consumer visiting a publisher web page or a web page of the business, based on the correlated call data and user data.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the scope of disclosed embodiments, as set forth by the claims.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Specific embodiments of the present disclosure will now be described with reference to the drawings. As will be recognized, the present disclosure is not limited to these particular embodiments. For instance, although described in the context of advertisements displayed on web pages of websites, the present disclosure may also be used in other types of interactive systems that support the display of selectable advertisements, such as interactive television systems.

The present disclosure relates to systems and methods that may provide targeted advertisements based on telephone calls by consumers to businesses that provide goods and/or services and based on online user data related to the consumer making the telephone call.

In some embodiments, consumers and/or businesses may elect to provide an opt-in preference that reflects their desire to transmit and/or receive call data and/or user to a correlating system. When a consumer and/or business opts-in to provide call data and/or user data, the call data and/or user may be used to display advertisements and/or content that relate to specific topics of interests in lieu of standard advertising content. The opt-in preferences may be a consumer-provided opt-in preference and/or a business-provided opt-in preference regarding telephone call data and/or user data that they wish to have used to order to provide targeted advertisement and/or content, instead of receiving advertising content that is typically presented in advertising spaces. Accordingly, specific information relating to a consumer's and/or a business's preferences may be provided in advertising spaces in lieu of traditional display advertisements or sponsored content.

Browsers and applications on a consumer's computing device, such as a laptop computer and/or mobile phone, may provide a consumer's associated user identifier to a publisher and/or advertiser when the consumer visits a web page or uses an application. The user identifier may be used to lookup corresponding user data about the consumer in order to provide targeted advertisements when the consumer visits the web page or uses the application.

According to embodiments of the present disclosure, call data related to a consumer's phone call to a business that provides goods and/or services may be used to provide targeted advertisements to the consumer, through a consumer's computing device, when the consumer visits a web page or uses an application, and/or through the consumer's telephone.

Call data may be received during and/or after a consumer calls a phone number of a business that provides goods and/or services. The call data may be transmitted from a telephone company handling the phones calls and/or by a business having a special identification number that forwards the call to the business's actual number. The call data may then be associated with the consumer. Then, a correlating system may be used to target and/or retarget advertisements to the consumer based on the call data and/or user data.

Figure 1:
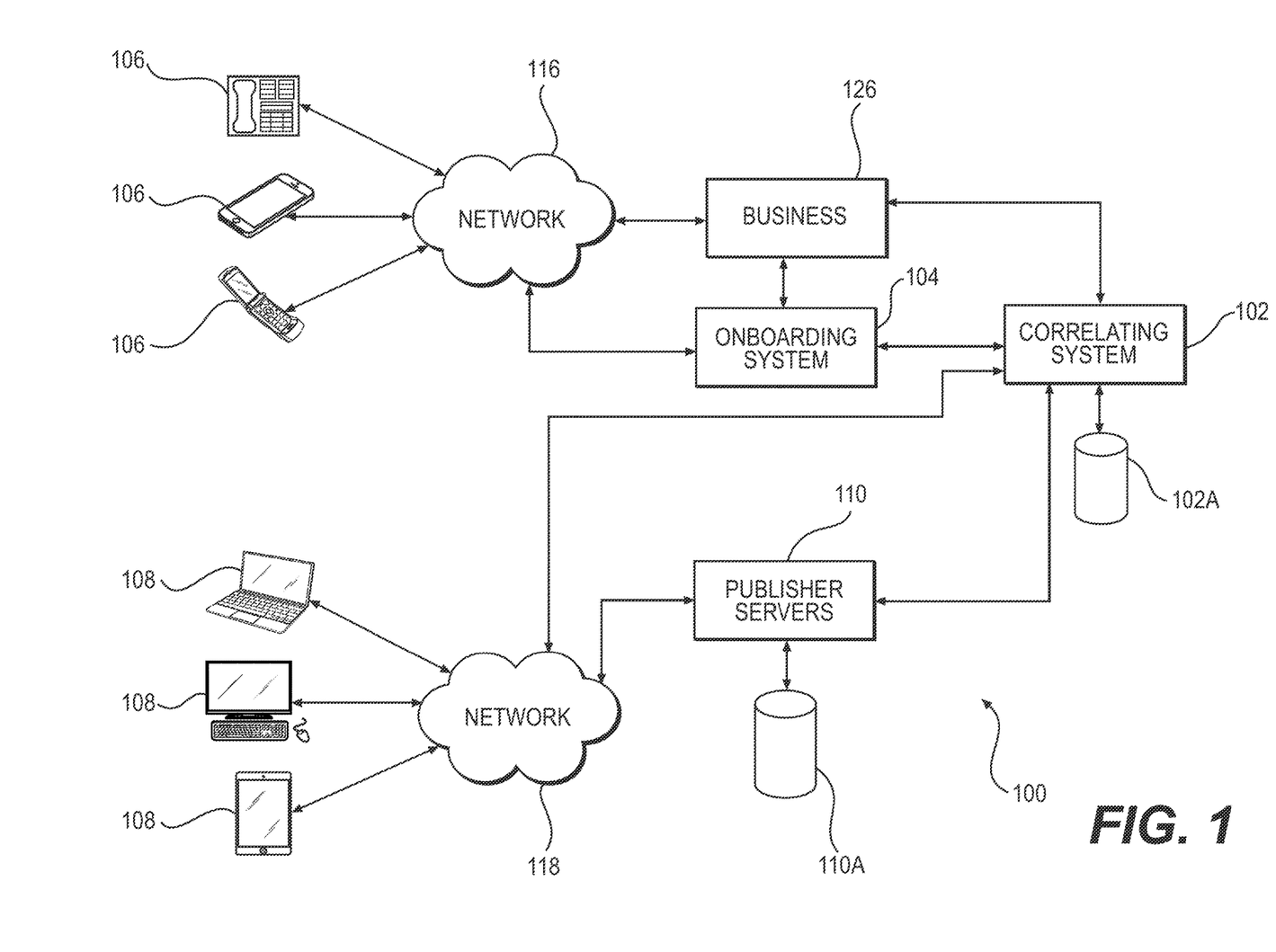
FIG. 1 depicts a schematic diagram of a network environment for storing and sharing telephone call data using online systems, according to an exemplary embodiment of the present disclosure.

FIG. 1 depicts a block diagram of a telephonic and online environment 100 in which telephone call data and online user data may be used for targeted advertising, according to embodiments of the present disclosure. A correlating system 102 may correlate call data, such as the telephone number of a consumer device, with user data associated with the consumer and stored in a database 102a. The correlation between the call data and user data may be used to provided targeted advertising to the consumer via a consumer's computing device 108 and/or through a telephone and/or mobile device 106.

The correlating system 102 may receive call data via a public switched telephone network ("PSTN") and/or a mobile telephone network 116 from the telephone and/or mobile device 106 of the consumer. The correlating system 102 may also receive user data via a network 118, such as the Internet, a private network, a public network, a wired network, and/or a wireless network, from the computing device 108 of the consumer. In cases in which the telephone and/or mobile device 106 is a smart phone, the telephone and/or mobile device 106 and the computing device 108 may be the same device.

A consumer, using the telephone and/or mobile device 106, may connect to the telephone network 116 by calling one or more telephone numbers associated with respective businesses 126. When a consumer calls a desired business 126, he or she may be dialing a phone number associated with the desired business. The dialed number may allow the call to be routed through the PSTN or mobile phone network 116 to the business 126. The telephone call may be routed directly to the desired business 126, and/or routed indirectly through an onboarding system 104 for collecting call data. In an embodiment, a business 126 may have an interactive voice response ("IVR") system to automate the interaction with the consumer.

Call data relating to the telephone call initiated by the consumer may be transmitted to the correlating system 102 by one or more of the business 126 and/or onboarder system 104. Call data may include one or more of call metadata, a telephone number dialed, a telephone number of the dialer, a call time, a call date, a length of the phone call, a type of the goods and/or services provided by the business associated with the telephone number, responses to an IVR system, data related to the consumer calling, and/or other data provided by the business 126 and/or onboarder system 104

A consumer, using a computing device 108, may interact with websites hosted by publishers servers 110 via network 118. Data related to the identity and/or interactions between the computing device 108 of the consumer and publisher servers 110 connected via network 118 may be used to generate user data stored in database 102a.

For example, the computing device 108 may include a web browser or other application that is used to interact with a publisher website, such as Huffington Post, Engadget, New York Times, Facebook, etc. The computing device 108 may be a personal computer, laptop computer, notebook computer, tablet computer, smartphone, portable media player, gaming device, or other computing device that allows a consumer to access websites and/or applications associated with publisher servers 110.

The computing device 108, via network 118, such as the Internet, may connect to websites and/or applications of publisher server 110. For example, the computing device 108 may receive, display, and interact with the publisher server 110 via HTTP and/or other supported communication protocol. To allow the consumer's online activity to be identified, a publisher server 110 may use a user identifier to identify activities of the consumer each time the publisher server 110 is connected to by the computing device 108 of the consumer. The user identifier may be a cookie associated with a browser, a unique device identifier such as an International Mobile Station Equipment Identity ("IMEI") number, an International Mobile Subscriber Identifier ("IMSI"), or other identifier that may be placed on the computing device 108 and/or read by the publisher server 110. For example, if a computing device 108 visits a website, the publisher server 110 may place a cookie on the computing device 108 reflecting the website session and certain activities that were performed. The publisher server 110 may store a record of the consumer's interaction with the website and/or application, including details regarding any advertisements that were served by the publisher to the consumer's computing device 108 in a publisher server database 110a. If the computing device 108 visits the website of the publisher server 110 again, then additional interactions and advertisements may be associated with the consumer by virtue of the stored cookie and/or other user identifier. The user data stored in the publisher server database 110a may be transmitted to the correlating system 102 to populate the user data stored in correlating system database 102a, and may be used to correlate the user data with the call data stored in the correlating system database 102a.

The correlating system 102 may correlate user identifiers representing online activities of consumers with telephone numbers associated with each consumer. A user identifier (e.g., a cookie, a device or subscriber identifier, a user ID) may be provided by a website of a publisher server 110 and/or other party to identify the online behavior of a consumer. The correlation between user identifier and telephone number may be explicitly identified, such as when a consumer provides a phone number to a website as part of a log-in process or as part of a purchase of a good or service through a website.

For example, publisher server 110 may receive a telephone number of a telephone and/or mobile device 106 by the consumer providing the telephone number as part of a transaction with a publisher website. For example, the consumer may order goods and services from the website by filling out a transaction form and include a name, address, telephone number, payment information, and other details. If the consumer provides a telephone number as part of a transaction with the website of the publisher server 110, the publisher server 110 may be able to correlate the online activities of the consumer, including any advertisements presented to the consumer, with the consumer's telephone number.

The correlation between user identifier and telephone number may also be implicitly identified, such as when a identification telephone number is displayed in an advertisement on a consumer's computing device 108, and a telephone call is received to that identification telephone number within a threshold period after display of the advertisement. Because of the inherent uncertainty in drawing correlations between user identifiers and telephone numbers, the correlating system 102 may include a confidence score associated with the user data and call data. The confidence score may represent the likelihood that a particular telephone number is correlated with a particular user identifier.

After correlating call data and user data with a particular consumer, targeted advertising via the telephone and/or mobile device 106 and/or the computing device 108 may be implemented by using either one or both of user data and call data. The correlating system 102 may use user data and call data stored in database 102a to identify consumers that may be re-targeted on behalf of a business 126 called by a consumer. The consumer may be re-targeted via one or both of telephone and/or mobile device 106 and the computing device 108.

The correlating system 102 may also be used for targeted advertising to consumers. For example, businesses 126 may be receiving telephone calls from potential customers that do not result in a conversion, such as a sale and/or information about the consumer. For example, a consumer may call a business 126 to ask questions about a product and/or services. When the business 126 receives the call from the consumer, the business 126 may be able to identify the consumer calling from caller ID. However, the business 126 may not receive, for example, a consumer's address and/or reason for calling. In order to target advertisements to those consumers that have failed to provide certain information to the business 126 as a result of the telephone call, the business 126 may provide call data, such as the consumer's telephone number and the type of goods and/or services provided by business 126 to correlating system 102. The business 126 may also provide an advertisement and/or request a certain action to be taken by correlating system 102.

Using the correlating system database 102a, the correlating system 102 may identify a user identifier that is associated with the telephone number. The correlating system 102 may use the identified user identifier, and provide user data and call data to publisher servers 110 to target advertisements to the consumer via the computing device 108 of the consumer. Thus, the correlating system 102 allows consumer calls to businesses 126 by telephone and/or mobile device 106 to be re-targeted by targeted advertising provided on websites of publisher servers 110 visited by the computing device 108.

Publisher servers 110 may transmit user data to the correlating system 102. The user data transmitted by publisher servers 102 may include user identifiers, impression data, and/or activity data. The consumer impression data received from publisher server 110 may be, for example, the display of an advertisement to the consumer, and/or a purchase of an item from a website by the consumer. The activity data may be, for example, a time and date of an interaction, a price of the goods and/or services viewed and/or ordered, a quantity of the goods and/or services order, and/or other information associated with an impression. User identifiers may be a user ID, a phone number that the consumer provided, address information, and/or log-in information. While the embodiments discussed herein describe the correlating system 102 receiving user data from a single publisher server 110, the correlating system 102 may receive user data from multiple publisher servers of multiple publishers.

As discussed above, the correlating system 102 may also receive call data of consumers' telephone calls to businesses 126. When a consumer dials a business 126, the business 126, PSTN and/or a mobile telephone network 116, and/or onboarder system 104 may determine the phone number associated with the telephone and/or mobile device 106 of the consumer by using, among other things, a caller identification ("caller ID") service. With a caller ID service, the consumer's telephone number may be transmitted to the business's 126 telephone equipment during the ringing signal, and/or when the call is being set up but before the call is answered. The detected telephone number may be captured and stored by the business 126 and/or onboarder system 104. Call data, which may include information relating to the interactions between the business 126 and the consumer may be maintained by the business 126 and/or onboarder system 104. The call data may then be transmitted by the business 126 and/or onboarder system 104 to the correlating system 102. Additionally, the call data may be transmitted to business 126 by onboarder system 104.

The call data provided by business 126 may be used by the correlating system 102 to provide targeted advertisements to consumers. Call data may include data related to an interaction of a consumer with a business 126. For example, call data may include data that indicates a characterization of the consumer's transaction with the business 126, such as that the consumer called to inquire about the address of the business 126. Call data may also include the telephone phone number of the telephone and/or mobile device 106 of the consumer, a time and a date of when the telephone call occurred, and/or a duration of the telephone call. If the business 126 has an IVR system, call data may also include the consumer entries in and/or responses to the IVR system. Business 126 may also provide call data that relates to the consumer, such as the name, an address, and/or an email address of the consumer. While the embodiments discussed herein describe the correlating system 102 receiving call data from a business 126 and/or onboarder system 104, the correlating system 102 may alternatively receive user data from multiple businesses and/or onboarder systems.

Once the correlating system 102 receives call data and user data, businesses 126 and publisher servers 110 may use the correlating system 102 to target consumers with advertisements.

Figure 2:
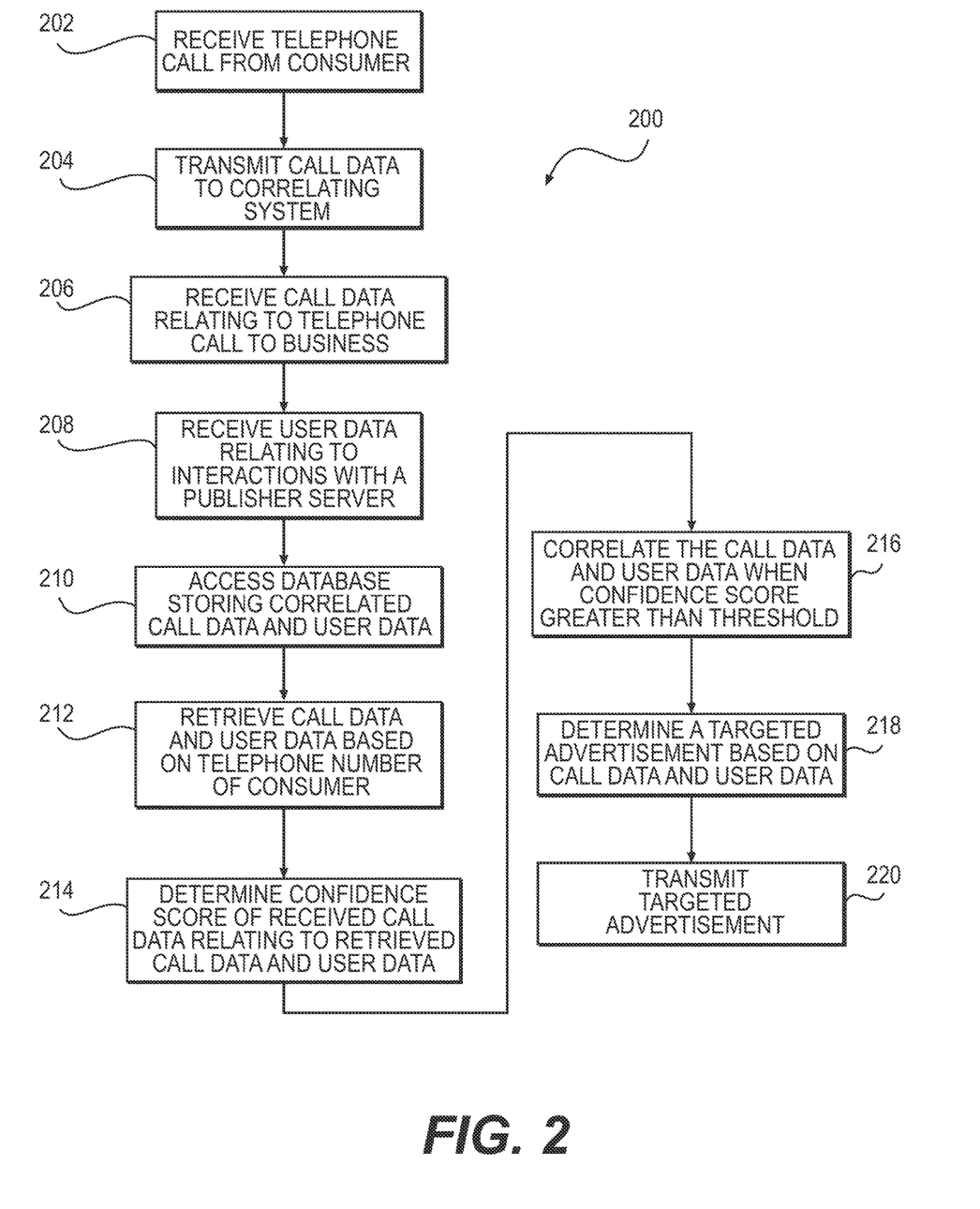
FIG. 2 depicts a flow diagram of an exemplary method for storing and sharing telephone call data using online systems, according to an exemplary embodiment of the present disclosure.

FIG. 2 depicts a flow diagram of a method 200 implemented by the correlating system 102 for identifying telephone calls and passing through data to online systems, according to embodiments of the present disclosure. The method 200 may be performed in part or in full by the correlating system 102. Some or all steps may be executed by a processor, and stored as a non-transitory computer-executable instructions in a memory.

At step 202, a business 126 may receive a telephone call from a telephone and/or mobile device 106 of a consumer. For example, a consumer may utilize telephone and/or mobile device 106 to dial a business telephone number. As described above, the business 126 and/or onboarder 104 may use automatic number identification and/or a caller ID to determine the telephone number of telephone and/or mobile device 106. The business 126 and/or onboarder 104 may also determine the dialed number. The business 126 and/or onboarder 104 may store call data, such as the consumer's telephone number, the time of the call, the number dialed, and so on.

At step 204, the business 126 and/or onboarder 104 may transmit call data to the correlating system 102. For example, the business 126 may determine which call data to transmit to the correlating system 102 for targeting the consumer. The business 126 may include a telephone number of the consumer, a time and date of the call, information about the business, and IVR data from the consumers' interactions with an IVR system if the business uses one. For example, while using an IVR system, the consumer may enter and/or provide information to the IVR system. This call data may be transmitted to the correlating system 102 for re-targeting and/or reconnecting with the consumer where the consumer left off in the business's 126 IVR system.

At step 206, the correlating system 102 may receive call data relating to one or more telephone calls to business 126 from one or more of the onboarder system 104 and/or business 126. As discussed above, the call data may include the phone number of telephone and/or mobile device 106 of the consumer and other call data relating to the telephone call.

At step 208, the correlating system 102 may receive user data relating to a consumer's interactions with one or more publisher servers 110. As discussed above, the user data may include a user identifier relating to the consumer and other data relation to the consumer.

At step 210, the correlating system 102 may access a correlating system database 102a that stores correlated call data and user data. Then, at step 212, the correlating system 102 may use the received telephone number of telephone and/or mobile device 106 to retrieve call data and user data correlated to the telephone number from the database 102a. For example, the system may use the phone number of telephone and/or mobile device 106 to retrieve a corresponding user identifier provided by a publisher server 110 and stored with the database 102a, along with corresponding user data stored in association with the user identifier. The correlating system 102 may also retrieve call data stored in the database 102a, as well as a confidence score of the associated user identifier that correlates to the telephone number.

At step 214, the correlating system 102 may determine whether the confidence score is above a threshold value. At step 216, if the confidence score is above a threshold value, the correlating system 102 may correlate the received call data from a business with the retrieved user data and call data stored in the database 102a.

At step 218, the correlating system 102 may determine a targeted advertisement to present to the consumer based on the received call data and the retrieved user data and call data when the confidence score is above the threshold value. Then, at step 220, the correlating system 102 may transmit the determined targeted advertisement to one or more of a publisher server 110, along with a user identifier, and/or to a telephone and/or mobile device 106 of the consumer.

For example, the correlating system 102 may request that a publisher server 110 display a targeted advertisement to the consumer's computing device 108 the next time the consumer uses a web browser to access a website of the publisher server 110. The publisher may identify the consumer by the user identifier that is provided by the correlating system 102. The publisher server 110 may then use the user identifier to serve advertisements to the consumer. Further, the publisher server 110 may notify the correlating system 102 when the requested targeted advertisement has been delivered to the consumer. If the requested targeted advertisement is not delivered to the consumer within a specified timeframe, the request by the correlating system 102 to have the targeted advertisement displayed may expire.

The targeted advertisement may be tailored to encourage the consumer to complete a transaction and/or reengage with the business 126. For example, the targeted advertisement may allow a consumer to bypass unnecessary menus in an IVR system that would otherwise make completing or reinitiating the transaction more cumbersome. For example, the consumer may be presented a special phone number for directly reaching a person (e.g., bypassing the IVR) who can directly engage the consumer.

In some embodiments, the targeted advertisement may be based on historical call data and user data, along with present call data and user data. For example, the targeted advertisement may be based on past advertisements already displayed to the consumer, past purchases of the consumer, known likes or dislikes of a consumer, demographic information characterizing the consumer, etc.

In some embodiments, a publisher server 110 may provide a user identifier to the correlating system 102, and request targeted advertisements to present to the consumer. The correlating system 102 may then determine a targeted advertisement to present to the consumer via publisher server 110.

In some embodiments, a business 126 may wish to target consumers that have recently purchased a particular product and/or service in order to sell consumers a warranty or extended service contracts, complementary products (e.g., cases, accessories, etc.), and/or other products and/or services. In another embodiment, a business 126 may wish to target consumers that may not have renewed their services. In yet another embodiment, a business 126 may use the correlating system 102 to target existing or new consumers, regardless of any prior interaction that the business may have had with the consumers.

Figure 3:
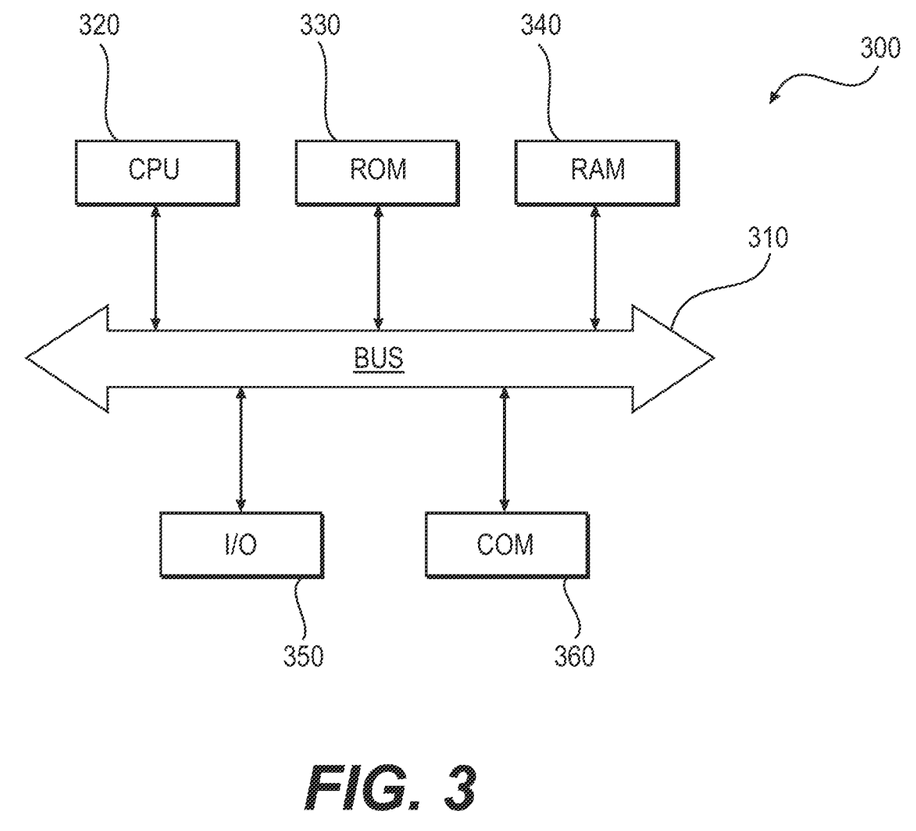
FIG. 3 is a simplified functional block diagram of a computer that may be configured as a device for executing the method of FIG. 2, according to exemplary embodiments of the present disclosure.

FIG. 3 is a simplified functional block diagram of a computer that may be configured as the user devices, servers, CDN, platforms, and/or exchanges for executing the methods, according to exemplary an embodiment of the present disclosure. Specifically, in one embodiment, any of the user devices, servers, CDN, platforms, and/or exchanges may be an assembly of hardware 300 including, for example, a data communication interface 360 for packet data communication. The platform may also include a central processing unit ("CPU") 320, in the form of one or more processors, for executing program instructions. The platform typically includes an internal communication bus 310, program storage, and data storage for various data files to be processed and/or communicated by the platform such as ROM 330 and RAM 340, although the system 300 often receives programming and data via network communications. The system 300 also may include input and output ports 350 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A computer-implemented method for determining a customized interactive automated voice menu, the method comprising:

receiving, over an electronic network, telephone call data relating to a telephone call made by a telephone device of a user to a business automated voice menu system, the telephone call data including a telephone number of the telephone device of the user;

accessing, by at least one processor, a database storing correlated telephone call data and user data;

retrieving, by the at least one processor, correlated telephone call data and user data based on the telephone number of the accessed correlated telephone call data, the telephone call data being associated with a single telephone number, and the user data being associated with a single user;

determining, by the at least one processor, a confidence score defining a confidence, based on a comparison between the accessed correlated telephone call data, associated with the single telephone number, and the retrieved user data associated with the single user, that the retrieved user data is stored in relation to the user who made the telephone call with the telephone device;

correlating, by the at least one processor, the received telephone call data with the retrieved correlated telephone call data and user data when the confidence score is greater than a threshold value;

accessing, by the at least one processor, a plurality of interactive automated voice menus of the business automated voice menu system, the plurality of interactive automated voice menus allowing users to navigate menu selections by voice; and determining and presenting, by the at least one processor, a customized interactive automated voice menu specific to the user, based on the correlated telephone call data associated with the user and the user data, the customized interactive automated voice menu allowing the user to listen to a targeted communication to selectively bypass one or more menus in the plurality of interactive automated voice menus determined to be unnecessary to complete a previously initiated transaction started by the user on a second telephone call prior to the telephone call.

2. The method according to claim 1, further comprising:

receiving, over the electronic network, user data relating to interactions with a publisher server of the business by a computing device of the user, the user data including a user identifier of the user; and determining, by the at least one processor, targeted content to display to the user on a publisher web page hosted by the publisher server, based on the user data relating to interactions with the publisher server by the computing device of the user.

3. The method according to claim 2, further comprising:

accessing, by at least one processor, the database storing correlated telephone call data and user data;

retrieving, by the at least one processor, correlated telephone call data and user data based on the user identifier of the user data; and correlating, by the at least one processor, the received user data with retrieved telephone call data and user data.

4. The method according to claim 2, further comprising:

receiving, over the electronic network, a content request from a publisher server, and transmitting, over the electronic network, the targeted content to the publisher server for display to the computing device of the user.

5. The method according to claim 4, wherein the targeted content relates to the business of the telephone called from the telephone device of the user.

6. The method according to claim 1, wherein the telephone call data includes at least one of call metadata, a telephone number dialed, a call time, a call date, a length of the phone call, a type of the goods and/or services provided by the business associated with the telephone number dialed, responses to an interactive voice response system, and data related to the user calling.

7. The method according to claim 1, wherein the telephone call data is received from one of the business of the telephone called from the telephone device of the user and an onboarder system.

8. A system for determining a customized interactive automated voice menu, the system including:

at least one data storage device that stores instructions system for storing and sharing telephone calls and passing data through to online systems; and at least one processor configured to execute the instructions to perform operations comprising:

receiving, over an electronic network, telephone call data relating to a telephone call made by a telephone device of a user to a business automated voice menu system, the telephone call data including a telephone number of the telephone device of the user;

accessing, by the at least one processor, a database storing correlated telephone call data and user data;

retrieving, by the at least one processor, correlated telephone call data and user data based on the telephone number of the accessed correlated telephone call data, the telephone call data being associated with a single telephone number, and the user data being associated with a single user;

determining, by the at least one processor, a confidence score defining a confidence, based on a comparison between the accessed correlated telephone call data, associated with the single telephone number, and the retrieved user data associated with the single user, that the retrieved user data is stored in relation to the user who made the telephone call with the telephone device;

correlating, by the at least one processor, the received telephone call data with the retrieved correlated telephone call data and user data when the confidence score is greater than a threshold value;

accessing, by the at least one processor, a plurality of interactive automated voice menus of the business automated voice menu system, the plurality of interactive automated voice menus allowing users to navigate menu selections by voice; and determining and presenting, by the at least one processor, a customized interactive automated voice menu specific to the user, based on the correlated telephone call data associated with the user and the user data, the customized interactive automated voice menu allowing the user to listen to a targeted communication to selectively bypass one or more menus in the plurality of interactive automated voice menus determined to be unnecessary to complete a previously initiated transaction started by the user on a second telephone call prior to the telephone call.

9. The system according to claim 8, the operations further comprising:

receiving, over the electronic network, user data relating to interactions with a publisher server of the business by a computing device of the user, the user data including a user identifier of the user; and determining, by the at least one processor, targeted content to display to the user on a publisher web page hosted by the publisher server, based on the user data relating to interactions with the publisher server by the computing device of the user.

10. The system according to claim 9, the operations further comprising:

accessing the database storing correlated telephone call data and user data;

retrieving correlated telephone call data and user data based on the user identifier of the user data; and correlating the received user data with retrieved telephone call data and user data.

11. The system according to claim 9, the operations further comprising:

receiving, over the electronic network, a content request from a publisher server, and transmitting, over the electronic network, the targeted content to the publisher server for display to the computing device of the user.

12. The system according to claim 11, wherein the targeted content relates to the business of the telephone called from the telephone device of the user.

13. The system according to claim 8, wherein the telephone call data includes at least one of call metadata, a telephone number dialed, a call time, a call date, a length of the phone call, a type of the goods and/or services provided by the business associated with the telephone number dialed, responses to an interactive voice response system, and data related to the user calling.

14. The system according to claim 8, wherein the telephone call data is received from one of the business of the telephone called from the telephone device of the user and an onboarder system.

15. A non-transitory computer-readable medium storing instructions that, when executed by a computer, cause the computer to perform a method for determining a customized interactive automated voice menu, the method including:
receiving, over an electronic network, telephone call data relating to a telephone call made by a telephone device of a user to a business automated voice menu system, the telephone call data including a telephone number of the telephone device of the user;
accessing, by at least one processor, a database storing correlated telephone call data and user data;
retrieving, by the at least one processor, correlated telephone call data and user data based on the telephone number of the accessed correlated telephone call data, the telephone call data being associated with a single telephone number, and the user data being associated with a single user;
determining, by the at least one processor, a confidence score defining a confidence, based on a comparison between the accessed correlated telephone call data, associated with the single telephone number, and the retrieved user data associated with the single user, that the retrieved user data is stored in relation to the user who made the telephone call with the telephone device;
correlating, by the at least one processor, the received telephone call data with the retrieved correlated telephone call data and user data when the confidence score is greater than a threshold value;
accessing, by the at least one processor, a plurality of interactive automated voice menus of the business automated voice menu system, the plurality of interactive automated voice menus allowing users to navigate menu selections by voice; and
determining and presenting, by the at least one processor, a customized interactive automated voice menu specific to the user, based on the correlated telephone call data associated with the user and the user data, the customized interactive automated voice menu allowing the user to listen to a targeted communication to selectively bypass one or more bypassed menus in the plurality of interactive automated voice menus determined to be unnecessary to complete a previously initiated transaction started by the user on a second telephone call prior to the telephone call.

16. The computer-readable medium according to claim 15, further comprising:
receiving, over the electronic network, user data relating to interactions with a publisher server of the business by a computing device of the user, the user data including a user identifier of the user; and
determining, by the at least one processor, targeted content to display to the user on a publisher web page hosted by the publisher server, based on the user data relating to interactions with the publisher server by the computing device of the user.

17. The computer-readable medium according to claim 16, further comprising:
accessing, by at least one processor, the database storing correlated telephone call data and user data;
retrieving, by the at least one processor, correlated telephone call data and user data based on the user identifier of the user data; and
correlating, by the at least one processor, the received user data with retrieved telephone call data and user data.

18. The computer-readable medium according to claim 16, further comprising:
receiving, over the electronic network, a content request from a publisher server, and
transmitting, over the electronic network, the targeted content to the publisher server for display to the computing device of the user.

19. The computer-readable medium according to claim 18, wherein the targeted content relates to the business of the telephone called from the telephone device of the user.

20. The computer-readable medium according to claim 15, wherein the telephone call data includes at least one of call metadata, a telephone number dialed, a call time, a call date, a length of the phone call, a type of the goods and/or services provided by the business associated with the telephone number dialed, responses to an interactive voice response system, and data related to the user calling.

* * * * *